May 17, 1927.  E. A. MUELLER ET AL  1,629,289
TIRE PATCH
Filed Jan. 23, 1926
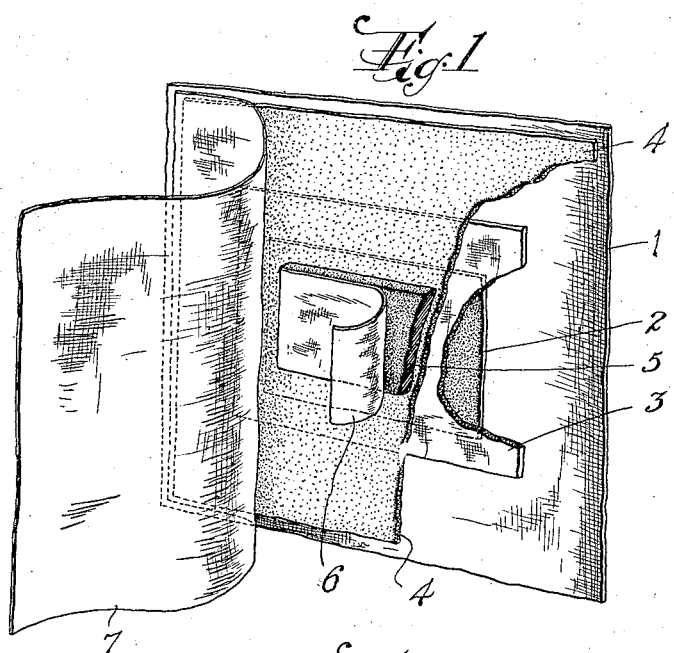
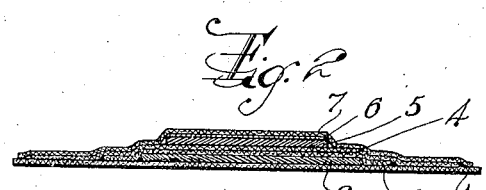
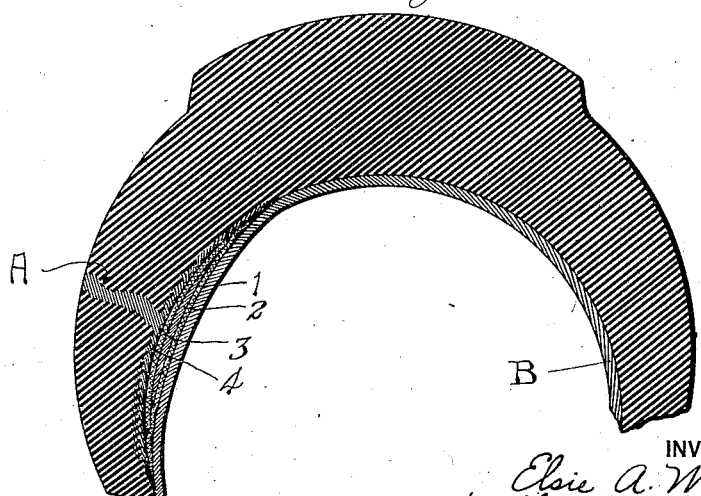
INVENTORS:
Elsie A. Mueller
and Charles C. Mueller, Jr.
BY Everett W. Cook, ATTORNEYS Patented May 17, 1927.

1,629,289

UNITED STATES PATENT OFFICE.

ELSIE A. MUELLER, OF CHESTERTOWN, NEW YORK, AND CHARLES C. MUELLER, JR., OF NEWARK, NEW JERSEY.

TIRE PATCH.

Application filed January 23, 1926. Serial No. 83,268.

This invention relates to patches for repairing holes or "blow-outs" or ruptures in pneumatic tire casings or shoes, and more particularly to such patches of the type which are interposed between the inner side of the casing or shoe and the outer side of the inner tube and fill the hole so as to reenforce the inner tube, protect it against the wear to which that part thereof adjacent the hole is subjected, and prevent water, gravel, etc., from entering the casing through the hole.

One object of the invention is to provide a novel and improved patch of the character described which will effectively fill the hole or blow-out and reenforce the casing against enlargement of said hole and prevent the inner tube from bursting through the hole.

Another object is to provide such a patch composed entirely of flat layers of fabric such as canvas or duck and raw or uncured rubber compound or gum, so that the gum will soften and run into the hole or blowout and spread over the fabric layers under the heat produced by inflating of the inner tube and running of the tire, whereby the various layers become thoroughly vulcanized together and to the tire casing, the patch when applied being in effect one piece and integral with the casing as distinguished from cemented layers of rubber and fabric or rubberized fabric vulcanized to the casing or pre-vulcanized layers cemented to the casing.
Further objects are to provide a patch of this character having the layers so constructed and arranged that the unvulcanized or uncured gum may freely run into and fill the hole in the casing and will be prevented from running away from the hole; to form the layers of such relative size and arrange them in such a manner as to enable the layers to adjust themselves relative to each other and to the tire casing to cause a complete contact at all points of the layers with each other and the patch with the casing, and to obtain other results and advantages as may be brought out by the following description.
Referring to the accompanying drawings, in which corresponding and like parts are designated throughout the several views by the same reference characters, Figure 1 is a perspective view of a tire patch embodying the invention, portions of the various layers being broken away for clearness in illustration;

Figure 2 is a vertical sectional view through the patch, taken on the line 2—2 of Figure 1, showing the patch in the form in which it is manufactured and sold, and Figure 3 is a transverse vertical sectional view through a tire casing or shoe and the patch applied thereto, showing the patch after it has become vulcanized to the shoe.

Specifically describing the illustrated embodiment of the invention, the patch comprises a base layer 1 of canvas or duck which is flat and substantially rectangular in plan. A layer of uncured rubber gum 2 is arranged upon one side of the base layer 1 substantially centrally thereof, said layer 2 being of less area than the base layer 1. Upon the layer 2 of uncured gum is arranged an intermediate layer 3 of canvas or duck of greater area than the layer 2 and substantially centrally disposed with respect thereto. A layer of frictioned fabric 4 of a size substantially equal to the base layer 1 is arranged upon the intermediate layer 3, with its marginal portions in contact with the marginal portions of the base layer 1. Substantially centrally disposed upon the exposed surface of the layer of frictioned fabric 4 is a second layer or block of uncured rubber gum 5 preferably of less area than the layer 2 of uncured gum. The frictioned fabric is a known product on the market and consists of a sheet of canvas or duck into which is forced under pressure as by calendering rolls an uncured rubber gum, the gum forming a coating upon one surface of the canvas. The frictioned fabric layer 4 is secured to the base layer 1 by a vulcanizable cement known in the art. A layer of muslin or other suitable fabric 6 may or may not be placed upon the exposed surface of the layer 5 of uncured gum to protect the same against contact with foreign objects during shipping or handling of the patch and to exclude air from the gum. A layer 7 of muslin or other suitable fabric is arranged upon the exposed side of the layer of frictioned fabric 4 to prevent the gum from sticking to exterior objects and exclude air from the gum. Preferably the intermediate layer 3 of canvas and the layer 4 of frictioned fabric are thinner or lighter in weight than the base layer 1.

In applying the patch to the repair of a blow-out or rupture in a tire casing, the interior of the tire casing adjacent the rupture and over an area somewhat greater than the area of the patch, is cleaned as usual. The protective layers 7 and 6 are then removed and the patch pressed against the interior surface of the tire casing with the block 5 of uncured rubber gum overlying the rupture or hole A, as shown in Figure 3 of the drawings, the fabric layers being pressed smoothly against the tire casing. The inner tube B of the tire is then inflated as usual and the expansion thereof tightly forces the patch into contact with the tire casing. The heat incident to the inflation of the inner tube and particularly to running of the tire causes the layers 2 and 5 of uncured gum to soften, the gum 5 running into the hole A in the casing and spreading somewhat around the edges of the hole on the inside of the casing. The gum in the layer 2 spreads over the adjacent surface of the base layer 1 and the intermediate layer 3 of fabric. The gum on the layer 4 of frictioned fabric also softens, and in a short time all of the gum in the layers 2 and 5 and on the layer 4 becomes vulcanized, whereby the hole A is tightly closed, the patch is securely vulcanized to the tire casing and the layers of fabric 1, 3 and 4 vulcanized together. The layer 2 of gum also serves as a cushion or follower to cooperate with the gum in the layer 5 in tightly closing the blow-out or hole A, in addition to providing for thorough vulcanization of the fabric layers. It will be understood that due to the preliminary softening of the unvulcanized gum as the heat rises, the fabric layers may slip relatively to each other so as to accurately adjust themselves to each other and the tire casing to provide a tight contact of the patch to the tire casing and of the various layers of fabric with each other throughout the area of the patch.

The patch may be made in several different sizes according to the size of the hole or blow-out, and the number of layers of material may be varied in accordance with the strength desired.

When the patch is applied to a tire casing it becomes in effect integral with the casing, effectively reenforces the portion of the casing adjacent the hole or blow-out, prevents the entrance of water and dirt into the tire casing and fully adapts itself to the pressures and blows to which the tire casing is subjected in use.

Having thus described the invention, what we claim is:

1. A tire patch comprising a plurality of layers of fabric, a layer of uncured rubber gum of less area than said layers of fabric centrally arranged therebetween, and a layer of uncured gum upon the exposed surface of one of said layers of fabric.

2. A tire patch comprising a base layer of fabric, a layer of frictioned fabric arranged upon one side of said base layer, a layer of uncured rubber gum arranged between said layers of fabric, and a second layer of uncured gum arranged upon the exposed side of said layer of frictioned fabric.

3. A tire patch comprising a base layer of fabric, a layer of frictioned fabric arranged upon one side of said base layer, a layer of uncured rubber gum of less area than and substantially centrally between said layers of fabric, and a second layer of uncured gum of less area than the first-mentioned layer of uncured gum and disposed substantially centrally upon the exposed side of said layer of frictioned fabric.

4. A tire patch comprising a base layer of fabric, a layer of frictioned fabric secured to one side of said base layer of fabric, a layer of uncured rubber gum arranged between and of less area than the first two-mentioned layers, and a second layer of uncured rubber gum on the exposed side of said layer of frictioned fabric.

5. A tire patch comprising a base layer of fabric, a layer of uncured rubber gum of less area than and arranged upon one side of said base layer, a layer of frictioned fabric of greater area than said layer of uncured gum arranged over the latter, a second layer of fabric between said layer of frictioned fabric and said layer of uncured gum, and a second layer of uncured gum upon the exposed side of said layer of frictioned fabric.

ELSIE A. MUELLER.
CHARLES C. MUELLER, Jr.